United States Patent
Mayumi et al.

[11] Patent Number: 5,859,583
[45] Date of Patent: Jan. 12, 1999

[54] OCCUPANT PROTECTION SYSTEM FOR AUTOMOTIVE VEHICLE

[75] Inventors: Nobuo Mayumi, Toyohashi; Mitsuhiko Masegi, Aichi-ken, both of Japan

[73] Assignee: Nippondenso Co., Ltd., Kariya-city, Japan

[21] Appl. No.: 677,735

[22] Filed: Jul. 10, 1996

[30] Foreign Application Priority Data

Jul. 11, 1995 [JP] Japan .................................. 7-174737

[51] Int. Cl.⁶ .............................. B60Q 1/00; B60R 21/32
[52] U.S. Cl. ..................... 340/436; 340/636; 280/735; 701/45
[58] Field of Search ................... 340/436, 636; 280/734, 735; 701/45

[56] References Cited

U.S. PATENT DOCUMENTS

| | | | |
|---|---|---|---|
| 3,871,472 | 3/1975 | Hosaka et al. | 280/735 |
| 4,438,424 | 3/1984 | Yasui | 280/735 |
| 5,101,192 | 3/1992 | Ishizuka | 280/735 |
| 5,187,382 | 2/1993 | Kondo | 307/10.1 |
| 5,187,465 | 2/1993 | Stonerook et al. | 280/735 |
| 5,204,547 | 4/1993 | Schumacher et al. | 280/735 |
| 5,432,385 | 7/1995 | Kincaid et al. | 280/735 |
| 5,493,270 | 2/1996 | Kondo | 340/438 |
| 5,621,326 | 4/1997 | Watanabe et al. | 280/735 |
| 5,668,528 | 9/1997 | Kitao et al. | 340/436 |

FOREIGN PATENT DOCUMENTS 3-042352 2/1991 Japan .
7-002051 1/1995 Japan .

Primary Examiner—Donnie L Crosland
Attorney, Agent, or Firm—Pillsbury Madison & Sutro LLP

[57] ABSTRACT

An occupant protection system for an automotive vehicle is provided which includes a pair of squibs for activating a pair of occupant protection units such as an airbag unit and a pretensioner for a seat belt, a backup capacitor, and a switching circuit. The switching circuit serves to allow the electric power stored in the backup capacitor to be supplied to at least one of the occupant protection units upon occurrence of a collision of the vehicle with another object when a sufficient power is not supplied from the power source to the squibs or when a line connected to the power source is broken by the collision of the vehicle.

10 Claims, 3 Drawing Sheets

OCCUPANT PROTECTION SYSTEM FOR AUTOMOTIVE VEHICLE

BACKGROUND OF THE INVENTION

1. Technical Field

The present invention relates generally to an occupant protection system for automotive vehicles having a plurality of occupant protection units such as airbags and pretensioners for seat belts, and more particularly to an improvement of a control circuit designed to activate at least one of occupant protection units in the event of a collision, even if a failure of power supplied to the control circuit from a vehicle's storage battery occurs.

2. Background of Related Art

FIG. 3 shows a conventional control circuit for an occupant protection system for an automotive vehicle having mounted therein a pair of airbags.

The control circuit includes a single backup capacitor and two safing sensors 2 and 3. When an acceleration sensor 4 detects sudden deceleration of the vehicle caused by a vehicle collision, a microcomputer 5 turns on both transistors 6 and 7, thereby supplying the voltage of a vehicle's storage battery 15 to a squib 8 through an ignition switch 17, a diode 1a, and the safing sensor 2 and also to a squib 9 through the ignition switch 17 and the safing sensor 3 for inflating the pair of airbags.

If a connection between the battery 15 and the control circuit is broken due to a collision of the vehicle, a microcomputer 5 turns on the transistor 6 in response to a signal from the acceleration sensor 4 and applies the voltage from the backup capacitor 1 to the squib 8 through the safing sensor 2 for activating one of the airbags.

The above conventional control circuit, however, encounters the drawback in that the use of the safing sensors equal to the number of airbags results in an increase in the number of component parts of the control circuit, thus leading to increased total costs of the system.

Additionally, since the control circuit provides the voltage of the backup capacitor 1 only to the squib 8, it is impossible to activate the squib 9 if the battery 15 is disconnected from the control circuit due to a collision. Specifically, it is impossible to change the activation of the airbag according to the demands of a user.

For avoiding the latter drawback, U.S. Pat. No. 5,187,465 to Stonerook et al. teach a dual airbag restraint system which includes an additional backup capacitor connected in series with a safing sensor corresponding to the safing sensor 3 in FIG. 3. This system, however, also has the drawback in that circuit components are increased.

U.S. Pat. No. 5,204,547 to Schumacher et al. teach the use of a single backup capacitor and a single safing sensor. All squibs are simultaneously activated in the event of a disconnection of the system from a vehicle's battery caused by an accident. This system, however, also has the drawback in that it is impossible to switch an airbag operation mode in accordance with user demands.

SUMMARY OF THE INVENTION

It is therefore a principal object of the present invention to overcome the disadvantages of the prior art.

It is another object of the present invention to provide a simple circuit structure of an occupant protection system for a vehicle which is designed to control operations of a plurality of protection units independently according to demands of a user even if a power source malfunctions upon occurrence of a collision of the vehicle.

According to one aspect of the present invention, there is provided an occupant protection system for a vehicle which comprises a circuit line connected to a power source mounted on the vehicle; a plurality of occupant protection units for protecting occupants from impact upon occurrence of a collision of the vehicle; a speed change rate determining means for determining a rate of change in speed of the vehicle; a safing sensor disposed in said circuit line for allowing said occupant protection units to be activated when the rate of change in speed determined by said speed change rate determining means is greater than a given value; a backup capacitor storing electrical energy supplied from the power source; a collision detecting means for detecting a collision of the vehicle based on the rate of change in speed determined by said speed change rate determining means, said collision detecting means being connected to said backup capacitor and the power source through said circuit line; a power determining means for determining whether a given power is supplied from the power source to said circuit line or not; and a voltage supplying means for supplying voltage through said safing sensor from said backup capacitor to part of said occupant protection units to activate the part of said occupant protection units when said collision detecting means detects the collision and when said power determining means determines that the given power is not supplied from the power source to said circuit line.

In the preferred mode of the invention, said voltage supplying means supplies the voltage of the power source to said plurality of occupant protection units through said safing sensor to activate said plurality of occupant units when said collision detecting means detects the collision and said power determining means determines that the given power is supplied from the power source to said circuit line.

The voltage supplying means includes a selection means for selecting the part of said occupant protection units based on a determination of said power determining means that the given power is supplied from the power source to said circuit line. The voltage supplying means allows the part of said occupant protection units selected by said selection means to be activated in response to the voltage supplied through said safing sensor from said backup capacitor.

The power determining means determines that the given power is not supplied from the power source to said circuit line when an electrical connection between the power source and said circuit line is broken.

According to another aspect of the invention, there is provided an occupant protection system for a vehicle which comprises a circuit line connected to a power source mounted on the vehicle; a plurality of occupant protection units for protecting occupants from impact upon occurrence of a collision of the vehicle; an acceleration determining means for determining an acceleration of the vehicle; a safing sensor disposed in said circuit line for allowing said occupant protection units to be activated when the acceleration determined by said acceleration determining means is greater than a given value; a backup capacitor storing electrical energy supplied from the power source; a collision detecting means for detecting a collision of the vehicle based on the acceleration determined by said acceleration determining means, said collision detecting means being connected to said backup capacitor and the power source through said circuit line; a power determining means for determining whether a given power is supplied from the power source to said circuit line or not; and a voltage supplying means for supplying voltage through said safing sensor from the power source to said plurality of occupant protection units to activate said plurality of occupant units when said collision detecting means detects the collision and said power determining means determines that the given power is supplied from the power source to said circuit line, said voltage supplying means supplying voltage through said safing sensor from said backup capacitor to part of said occupant protection units to activate the part of said occupant protection units when said collision detecting means detects the collision and when said power determining means determines that the given power is not supplied from the power source to said circuit line.

According to a further aspect of the invention, there is provided an occupant protection system for a vehicle which comprises a plurality of occupant protection units mounted in the vehicle for protecting occupants from impact upon occurrence of a collision of the vehicle; a backup capacitor holding a hold voltage based on voltage of the power source; a collision detecting sensor for detecting a collision of the vehicle with another object; a collision determining means for determining the presence or absence of the collision of the vehicle based on an output from said collision detecting sensor, said collision determining means receiving at least one of voltage from the power source and the hold voltage of said backup capacitor to be activated; a control means for controlling said occupant protection units to be activated when the collision detecting means determines the presence of the collision of the vehicle, said control means receiving at least one of the voltage from the power source and the hold voltage of said backup capacitor to be activated; and a power determining means for determining whether a given power is supplied from the power source to said control means or not. The control means receives the hold voltage of said backup capacitor to activate part of said occupant protection units when said collision determining means determines the presence of the collision of the vehicle and said power determining means determines that the given power is not supplied from the power source to said control means.

In the preferred mode of the invention, said occupant protection units include an airbag unit and a pretensioner for a seat belt mounted in the vehicle. The control means receives the hold voltage of said backup capacitor to activate only the airbag unit when said collision determining means determines the presence of the collision of the vehicle and said power determining means determines that the given power is not supplied from the power source to said control means.

A safing sensor is further provided for allowing said occupant protection units to be activated when a rate of change in speed of the vehicle is greater than a preselected value. The airbag unit receives the hold voltage of said backup capacitor through said safing sensor to be activated.

According to a further aspect of the invention, there is provided an occupant protection system for a vehicle which comprises a first electrically-activated occupant protection unit; a second electrically-activated occupant protection unit; a main power source; an auxiliary power source connected to said main power source; a first means for connecting said main power source to said first and second electrically-activated occupant protection units upon occurrence of a collision of the vehicle with another object; and a second means for connecting said auxiliary power source only to said second electrically-activated occupant protection unit upon occurrence of a collision of the vehicle when the power source is malfunctioning.

According to a still further aspect of the invention, there is provided an occupant protection system for a vehicle which comprises a plurality of electrically-activated occupant protection units; a main power source; a means for connecting said main power source to said electrically-activated occupant protection units upon occurrence of a collision of the vehicle with another object; and an auxiliary power source serviceable in place of said main power source, said auxiliary power source being so arranged as to provide electric power to given part of said electrically-activated occupant protection units upon occurrence of a collision of the vehicle when said main power source is not in service.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
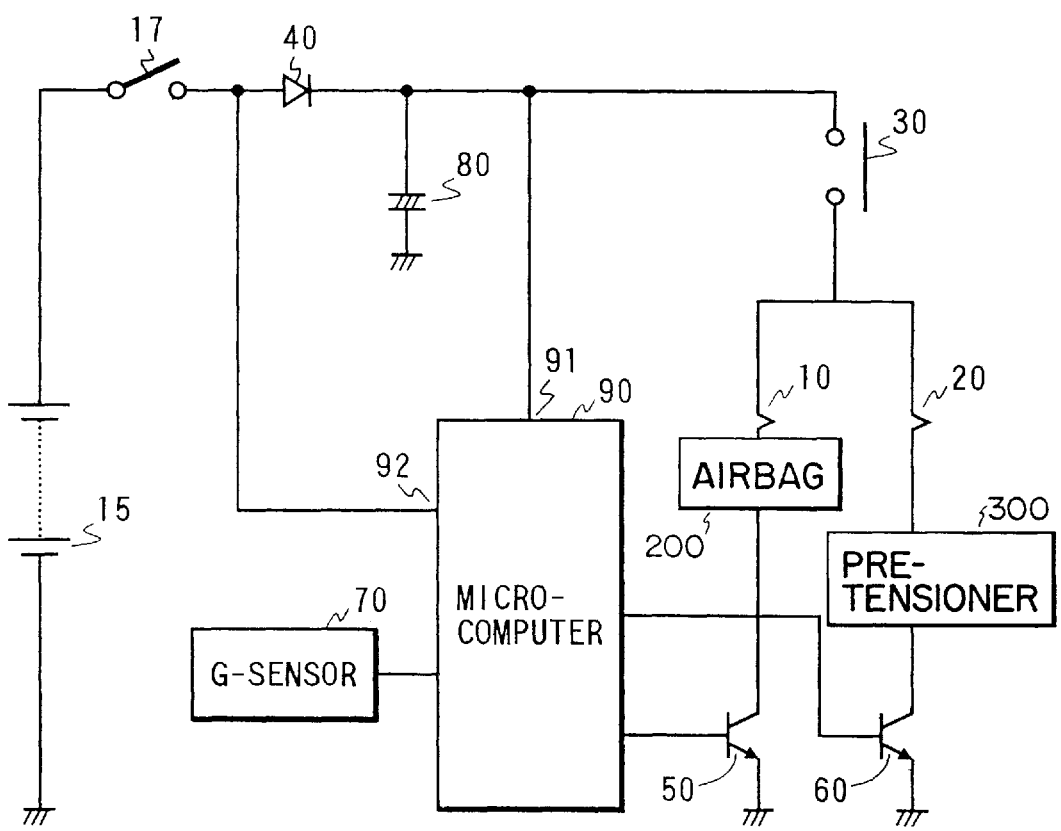
FIG. 1 is a block diagram which shows an occupant protection system for an automotive vehicle according to the present invention.

Referring now to the drawings, particularly to FIG. 1, there is shown an occupant protection system for an automotive vehicle according to the present invention.

The occupant protection system includes generally a control circuit 100, an airbag unit 200, and a pretensioner 300.

The control circuit 100 is connected to a storage battery 15 and an ignition switch 17 mounted in the vehicle and includes a diode 40, a backup capacitor 80, an acceleration sensor 70 (hereinafter, referred to as a G-sensor), a microcomputer 90, a safing sensor 30, a pair of squibs 10 and 20, and a pair of transistors 50 and 60.

The squib 10 outputs a signal to the airbag unit 200 to inflate an airbag for protecting a vehicle operator from impact upon occurrence of an accidental collision. The squib 20 outputs a signal to the pretensioner 300 disposed on a front passenger's seat to fasten a seat belt quickly.

Squibs 10 and 20 are both connected at their terminals to the battery 15 through the safing sensor 30, the diode 40, and the ignition switch 17 and at the other terminals to collectors of the transistors 50 and 60, respectively.

The safing sensor 30 is designed to avoid a malfunction of the occupant restrain system caused by electrical disturbance or noise and is normally made of an open type of mechanical switch which is, turned on when a negative rate of change in speed of the vehicle, e.g. deceleration, is increased above a given level. The safing sensor 30, when turned on, connects the battery 15 and the squibs 10 and 20 through the ignition switch 17 and the diode 40 to apply the voltage of the battery 15 to the squibs 10 and 20.

The G-sensor 70 measures the degree of acceleration of the vehicle to provide an acceleration signal to the microcomputer 90.

The backup capacitor 80 serves to provide the electric power to the microcomputer 90 and the squibs 10 and 20 for a given period of time when the ignition switch 17 is disconnected from the battery 15 upon quick deceleration caused by collision of the vehicle with another object. The backup capacitor 80 is connected at one end to ground and at the other end to a common terminal between the diode 40 and the safing sensor 30 and charged with electrical energy supplied from the battery 15 through the ignition switch 17 and the diode 40. In this configuration the backup capacitor 80 functions as an auxiliary power source which applies the voltage to a power terminal 91 of the microcomputer 90 and also to the squibs 10 and 20 through the safing sensor 30. The capacitance of the backup capacitor 80 is set to a minimum value corresponding to a time required for activating the squib 10 normally (e.g. , . , 100 msec.) after the disconnection of the ignition switch 17 from the battery 15.

Figure 2:
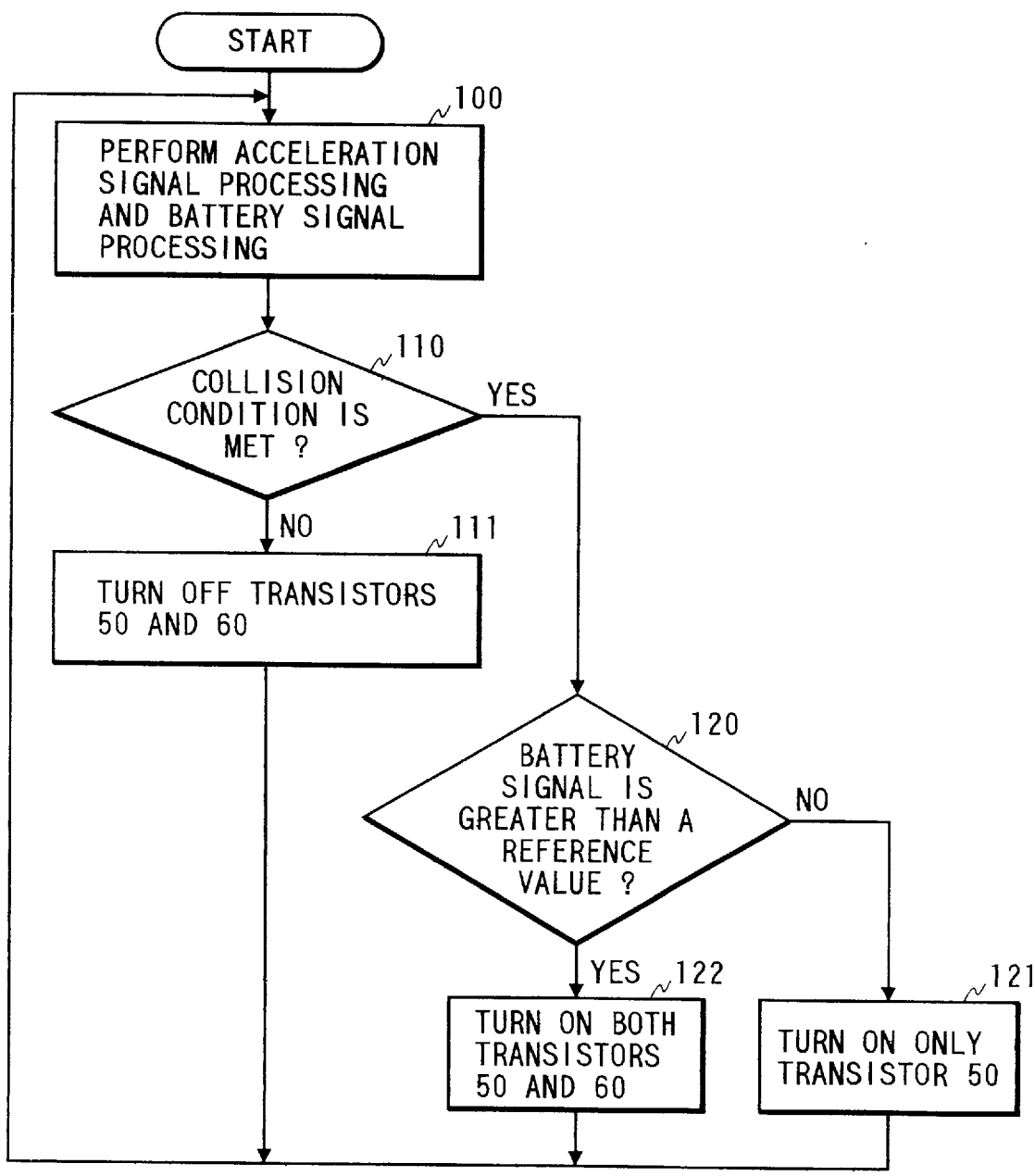
FIG. 2 is a flowchart of a program performed by a microcomputer of the occupant protection system shown in FIG. 1.
Figure 3:
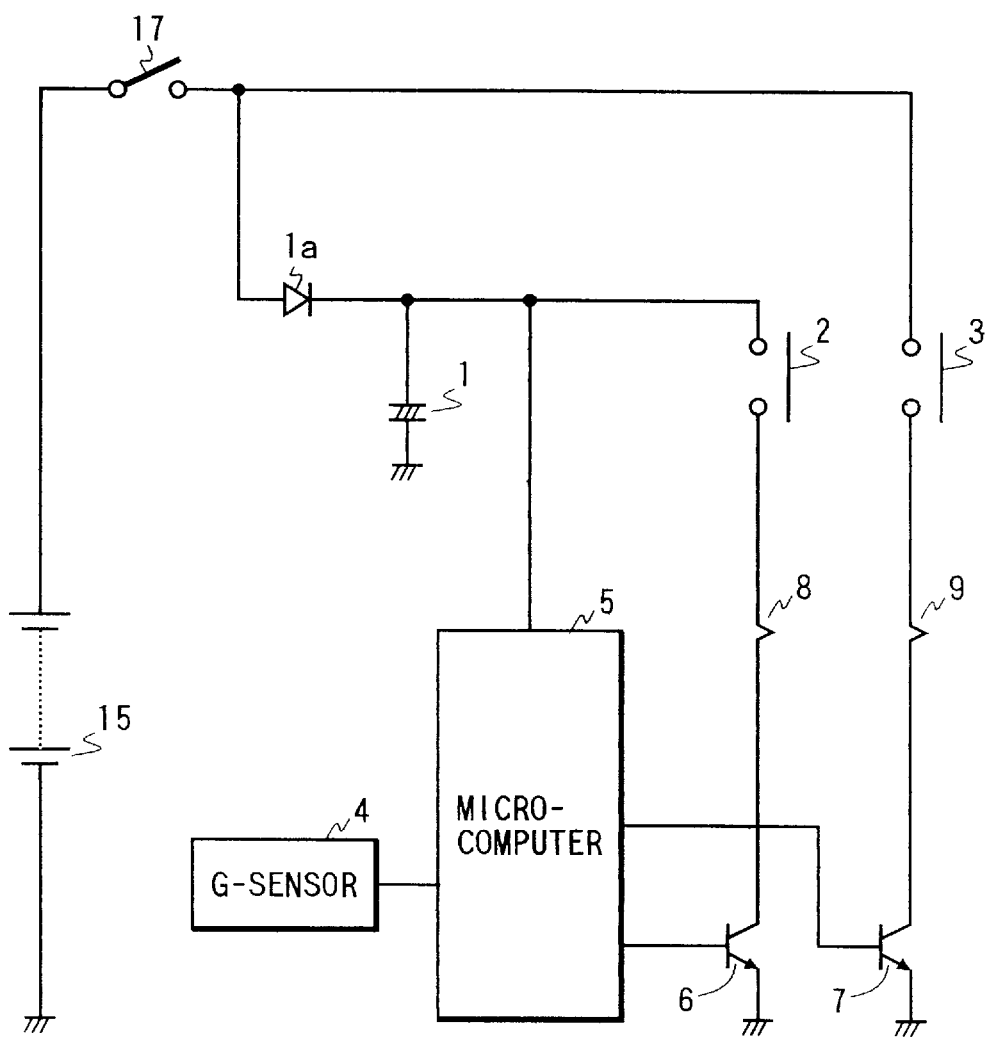
FIG. 3 is a block diagram which shows a conventional occupant protection system.

The microcomputer 90 is supplied at the power terminal 91 with the power from the battery 15 through the ignition switch 17 and the diode 40 or directly from the backup capacitor 80 to execute a program, as shown in FIG. 2, stored in a ROM thereof. The microcomputer 90 controls on/off operations of the transistors 50 and 60 for establishing connections of the squibs 10 and 20 to ground based on a voltage level at the input terminal 92 and the acceleration signal from the G-sensor 70.

The input terminal 92 of the microcomputer 90 is connected to a positive terminal of the battery 15 through the ignition switch 17. The voltage level of the input terminal 92 serves as a signal for determining whether the power of the battery 15 is supplied to the control circuit 100 or not, in other words, whether the connection between the battery 15 and the ignition switch is established or not.

In operation, when the ignition switch 17 is turned on to start an engine of the vehicle, the power of the battery 15 is supplied to the microcomputer 90 through the power terminal 91. At the same time, the backup capacitor 80 is charged with electrical energy supplied from the battery 15 through the ignition switch 17 and the diode 40.

Upon initiation of the program shown in FIG. 2, the routine proceeds to step 100 wherein given acceleration signal processing of the acceleration signal from the G-sensor 70 is performed, and at the same time, battery signal processing is performed based on the voltage level of the input terminal 92 of the microcomputer 90.

In the acceleration signal processing, a value of the acceleration signal from the G-sensor 70, that is, the acceleration of the vehicle, is integrated over a given time period (e.g., 10 msec) to provide an integration signal. In the battery signal processing, when the voltage level of the input terminal 92 of the microcomputer 90 is equal to the voltage level of the battery 15 (i.e., a high level), a signal having a level greater than a given reference value is provided as a battery signal. Additionally, when the ignition switch 17 is disconnected from the battery 15 or the battery 15 is not in a condition to provide a sufficient power to the control circuit 100, a signal having a level smaller than the given reference value is provided as the battery signal.

The routine then proceeds to step 110 to determine whether a collision condition for determining the occurrence of an accidental collision is met or not based on the integration signal derived in step 100. For example, it is determined whether the integration value of the acceleration signal from the G-sensor 70 is greater than a given threshold value or not.

In the absence of an accidental collision, the routine then proceeds to step 111 where transistors 50 and 60 are maintained off so that the squibs 50 and 60 are both maintained in an off state.

Alternatively, if the accidental collision occurs, then the routine proceeds to step 120 to determine there is not whether the power sufficient to operate the control circuit 100 normally is provided from the battery 15 or not based on the battery signal derived in step 100. If a NO answer is obtained, meaning that there is not sufficient power supplied to the system, then the routine proceeds to step 121 where only transistor 50 is turned on. This causes the voltage of the backup capacitor 80 to be applied to the squib 10 through the safing sensor 30 so that the airbag unit 200 can be activated.

The reason for only turning on transistor 50 in step 121 is because it is desirable that a capacitor whose capacitance is capable of activating at least the squib 10 be used as the backup capacitor 80 for compact and lightweight structure of the system.

If a YES answer is obtained in step 120, meaning that the power of the battery 15 continues to be supplied to the control circuit 100 after the accidental collision, then the routine proceeds to step 122 wherein both transistors 50 and 60 are turned on, thereby applying the voltage of the battery 15 to the squibs 10 and 20 so that the airbag unit 200 and the pretensioner 300 are activated.

As will be apparent from the above discussion, a circuit configuration wherein the squibs 10 and 20 arranged in parallel are connected to the safing sensor 30 and the diode 40 in series allows only squib 10 to be turned on upon occurrence of a collision causing the disconnection of the ignition switch 17 from the battery 15. In other words, one of a plurality of squibs or occupant protection units can be activated by the use of the single safing sensor 30 and the single backup capacitor 80. Additionally, the squib or occupant protection unit to be activated can easily be selected simply by changing the transistor to be turned on.

Therefore, for example, if three occupant protection units are mounted on a vehicle, any two of the protection units can be activated by use of a single backup capacitor and a single safing sensor. In this case, it is necessary for the backup capacitor to have a capacitance enough to operate two squibs normally.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, while in the above embodiment, the backup capacitor 80 is charged with electrical energy supplied from the battery 15 through the diode 40, the voltage provided from the battery 15 through the diode 40 may be increased using a known means to supply it to the backup capacitor 80.

Further, logical steps, as discussed in FIG. 2, may be realized using known hardware arrangements.

What is claimed is:

1. An occupant protection system for a vehicle comprising:

a circuit line connected to a power source mounted on the vehicle;

a plurality of occupant protection units for protecting occupants from impact upon occurrence of a collision of the vehicle;

speed change rate determining means for determining a rate of change in speed of the vehicle;

a safing sensor disposed in said circuit line for allowing said occupant protection units to be activated when the rate of change in speed, as determined by said speed change rate determining means, is greater than a predetermined value;

a backup capacitor for storing electrical energy supplied from the power source;

collision detecting means for detecting a collision of the vehicle based on the rate of change in speed determined by said speed change rate determining means, said collision detecting means being connected to said backup capacitor and said power source through said circuit line;

power determining means for determining whether power is supplied from said power source to said circuit line; and voltage supplying means for supplying voltage through said safing sensor from said backup capacitor to a portion of said occupant protection units in order to activate the portion of said occupant protection units when said collision detecting means detects the collision and when said power determining means determines that the power is not supplied from said power source to said circuit line.

2. An occupant protection system as set forth in claim 1, wherein said voltage supplying means supplies voltage of the power source to said plurality of occupant protection units through said safing sensor to activate said plurality of occupant units when said collision detecting means detects the collision and said power determining means determines that the power is supplied from said power source to said circuit line.

3. An occupant protection system as set forth in claim 1, wherein said voltage supplying means includes selection means for selecting the portion of said occupant protection units based on a determination of said power determining means that power is supplied from said power source to said circuit liner, said voltage supplying means allowing said portion of occupant protection units selected by said selection means to be activated in response to the voltage supplied through said safing sensor from said backup capacitor.

4. An occupant protection system as set forth in claim 1, wherein said power determining means determines that power is not supplied from said power source to said circuit line when an electrical connection between said power source and said circuit line is broken.

5. An occupant protection system for a vehicle comprising:

a circuit line connected to a power source mounted on the vehicle;

a plurality of occupant protection units for protecting occupants from impact upon occurrence of a collision of the vehicle;

acceleration determining means for determining acceleration of the vehicle;

a safing sensor disposed in said circuit line for allowing said occupant protection units to be activated when the acceleration determined by said acceleration determining means is greater than a predetermined value;

a backup capacitor storing electrical energy supplied from the power source;

collision detecting means for detecting a collision of the vehicle based on the acceleration determined by said acceleration determining means, said collision detecting means being connected to said backup capacitor and said power source through said circuit line;

power determining means for determining whether power is supplied from said power source to said circuit line; and voltage supplying means for supplying voltage through said safing sensor from said power source to said plurality of said occupant protection units to activate said plurality of said occupant units when said collision detecting means detects a collision and said power determining means determines that the power is supplied from said power source to said circuit line, said voltage supplying means supplying voltage through said safing sensor from said backup capacitor to a portion of said occupant protection units to activate a preselected portion of said occupant protection units when said collision detecting means detects a collision and said power determining means determines that the power is not supplied from said power source to said circuit line.

6. An occupant protection system for a vehicle comprising:

a plurality of occupant protection units mounted in the vehicle for protecting occupants from impact upon occurrence of a collision of the vehicle;

a backup capacitor storing a hold voltage based on a voltage of a power source;

a collision detecting sensor for detecting a collision of the vehicle with another object;

collision determining means for determining the presence or absence of a collision of the vehicle based on an output from said collision detecting sensor, said collision determining means receiving at least one of said voltage from the power source and said hold voltage;

control means for controlling said occupant protection units to be activated when the collision detecting means determines the occurrence of a collision of the vehicle, said control means receiving at least one of said voltage from said power source and said hold voltage; and power determining means for determining whether power is supplied from said power source to said control means or not, wherein when said collision determining means determines the occurrence of a collision of the vehicle, said power determining means determines that power is not supplied from said power source to said control means, and said control means receives said hold voltage to activate a preselected portion of said occupant protection units.

7. An occupant protection system as set forth in claim 6, wherein said occupant protection units include an airbag unit and a pretensioner for a seat belt mounted in the vehicle, and wherein said control means receives the hold voltage of said backup capacitor to activate only the airbag unit when said collision determining means determines the occurrence of a collision of the vehicle and said power determining means determines that the power is not supplied from said power source to said control means.

8. An occupant protection system as set forth in claim 6, further comprising a safing sensor for allowing said occupant protection units to be activated when a rate of change in speed of the vehicle is greater than a preselected value, and wherein said airbag unit receives the hold voltage of said backup capacitor through said safing sensor to be activated.

9. An occupant protection system for a vehicle comprising:

a first electrically-activated occupant protection unit;

a second electrically-activated occupant protection unit;

a main power source;

power determining means for determining whether said main power source is malfunctioning;

an auxiliary power source connected to said main power source;

first means for connecting said main power source to said first and second electrically-activated occupant protection units upon occurrence of a collision of the vehicle; and second means for connecting said auxiliary power source only to said second electrically-activated occupant protection unit upon occurrence of a collision of the vehicle when said power determining means determines that said main power source is malfunctioning.

10. An occupant protection system for a vehicle comprising:

a plurality of electrically-activated occupant protection units;

a main power source;

power determining means for determining whether said main power source is in service;

means for connecting said main power source to said electrically-activated occupant protection units upon occurrence of a collision of the vehicle; and an auxiliary power source serviceable in place of said main power source, said auxiliary power source being configured so as to only provide electric power to preselected electrically-activated occupant protection units upon occurrence of a collision of the vehicle when said power determining means determines that said main power source is not in service.

* * * * *